United States Patent
Southam

(10) Patent No.: US 8,434,733 B2
(45) Date of Patent: May 7, 2013

(54) VALVE FOR CONTROL OF HIGH PRESSURE AIR PRESSURE AIR PULSE

(75) Inventor: Matthew Southam, Milperra (AU)

(73) Assignee: Goyen Controls Co Pty Limited, Rydalmare NSW (AU)

( * ) Notice: Subject to any disclaimer, the term of this patent is extended or adjusted under 35 U.S.C. 154(b) by 42 days.

(21) Appl. No.: 13/116,708

(22) Filed: May 26, 2011

(65) Prior Publication Data

US 2011/0226976 A1 Sep. 22, 2011

Related U.S. Application Data

(63) Continuation of application No. 12/088,914, filed on Apr. 1, 2008, now Pat. No. 7,984,727.

(30) Foreign Application Priority Data

Oct. 5, 2005 (AU) ................................ 2005905498

(51) Int. Cl.
F16K 31/122 (2006.01)

(52) U.S. Cl.
USPC ........................................... 251/63; 251/63.5

(58) Field of Classification Search .................... 251/62, 251/63, 63.5, 63.6
See application file for complete search history.

(56) References Cited

U.S. PATENT DOCUMENTS

| | | | |
|---|---|---|---|
| 2,778,598 A | 1/1957 | Bolling, Jr | |
| 3,451,423 A * | 6/1969 | Priese | 251/63.5 |
| 3,729,168 A | 4/1973 | Natho et al. | |
| 4,003,399 A | 1/1977 | Fischer | |
| 4,239,058 A | 12/1980 | Peters | |
| 4,267,861 A | 5/1981 | Roth | |
| 5,662,140 A | 9/1997 | Rucker | |
| 5,884,895 A | 3/1999 | Wolz et al. | |
| 6,035,883 A * | 3/2000 | Benjey | 137/202 |
| 7,278,441 B2 * | 10/2007 | Tanikawa et al. | 251/63.5 |
| 7,434,780 B2 | 10/2008 | Hayashi et al. | |

FOREIGN PATENT DOCUMENTS

| | | |
|---|---|---|
| EP | 0849513 A2 | 6/1998 |
| GB | 905071 A1 | 9/1962 |

* cited by examiner

Primary Examiner — Kevin Lee

(57) ABSTRACT

A valve for use in the control of pressurized air from a pressure tank, the pressure tank including a wall in which an outlet port is formed, the wall having an inner surface and an outer surface. The valve comprises a valve body of generally cylindrical configuration having an inner end which in use is located inside the pressure tank and an outer end which in use is located outside of the tank. A flow passage extends through the valve body, the flow passage having an inlet at or adjacent the inner end of the body and an outlet at or adjacent the outer end of the body. A valve seat surrounds the flow passage and a valve closure member is moveable towards and away from the valve seat to close and open the valve respectively. An operating means is provided for moving the valve closure member in order to operate the valve. The valve is characterized in that the valve body has at least one laterally extending mounting formation at or adjacent the inner end thereof, the mounting formation being shaped and dimensioned to enable the inner end and the mounting formation to be introduced into the pressured tank through the outlet port, and when in position, the mounting formation engages with the inner surface of the wall of the tank adjacent the outlet port. The valve includes a mounting collar movable towards the mounting formation so as to engage the outer surface of the wall adjacent the opening and thereby clamp the tank wall between the mounting formation and the mounting collar.

20 Claims, 4 Drawing Sheets

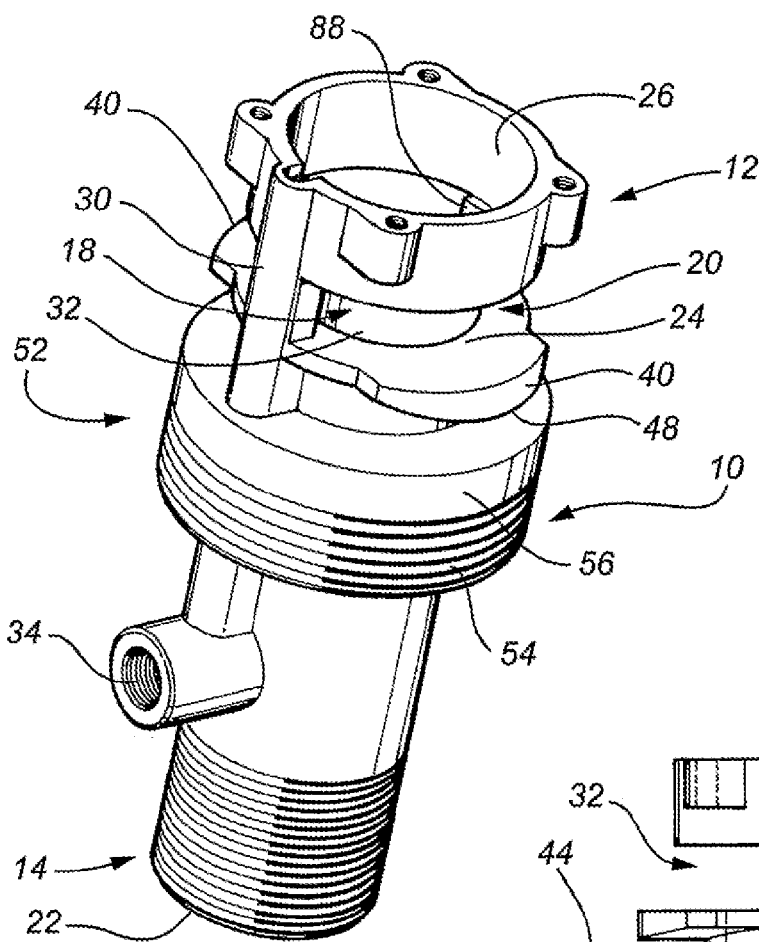
FIG. 1
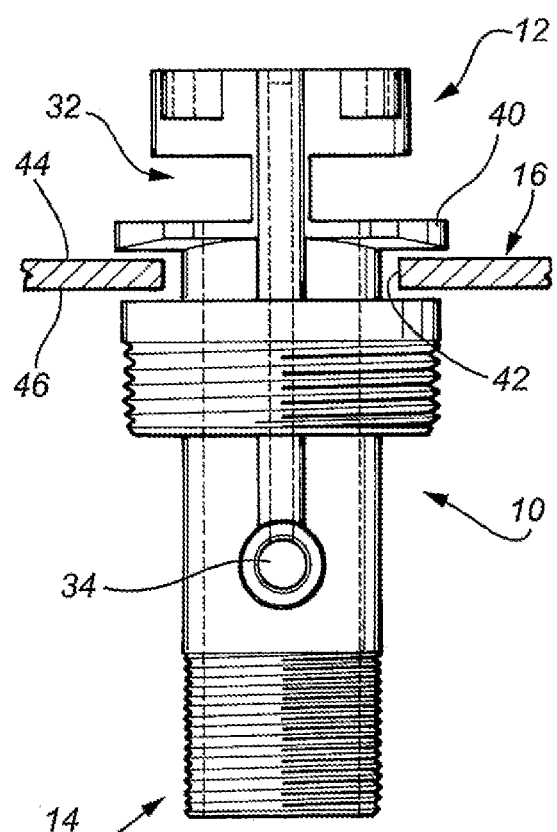
FIG. 2
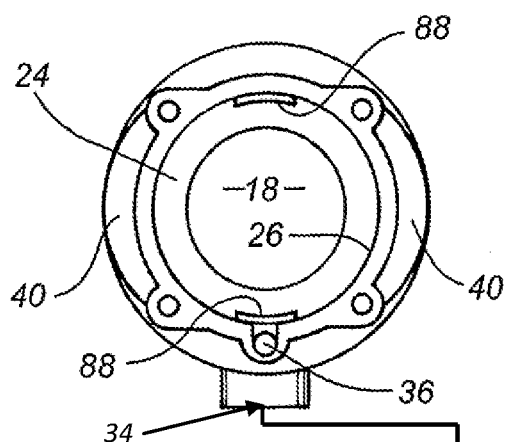
FIG. 3
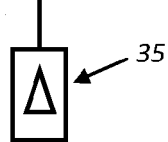

VALVE FOR CONTROL OF HIGH PRESSURE AIR PRESSURE AIR PULSE

CROSS-REFERENCE TO RELATED APPLICATIONS

This is a continuation of pending U.S. patent application Ser. No. 12/088,914, filed Apr. 1, 2008, the entirety of which application is expressly incorporated herein by reference.

FIELD OF THE INVENTION

This invention relates to a valve for the control of a high pressure air pulse as might be employed, for example, in a reverse pulse filter cleaning system.

BACKGROUND OF THE INVENTION

Reverse pulse filter cleaning systems are well known and different systems have control valves with particular attributes which provide different degrees of cleaning efficiencies for particular applications.

Generally, it is desirable that the valve which controls the pulse of air is able to open rapidly and should have a clear flow passage through the valve in order that the pulse of high pressure air which impacts the filter defines a relatively sharp peaked pressure wave which will in turn provide the most effective cleaning or particle dislodgement force.

The rapidity with which the valve opens and closes leads to improved efficiency in the system. A valve that closes slowly, for example, will tend to waste high pressure air, adding to the cost of running the cleaning system. Likewise, a valve which opens slowly will tend to produce a somewhat dissipated peak pulse which will be less effective in cleaning the filter.

Valves which are used in filter cleaning operations need to be serviced or maintained from time to time. Also, in a typical application there are a large number of valves which need to be fitted and, accordingly, the speed with which valves can be fitted, and removed and replaced for maintenance purposes, is relatively important. Thus, the mounting arrangement should preferably be relatively straightforward to employ but, whatever mounting arrangement is used, the efficiency of the valve should not be compromised because of the particular mounting arrangement that has been selected.

Typically, high pressure air which is used to provide the reverse pulse is conveyed or supplied in a conduit or tank to which the individual valves are mounted. The tank will normally be of sufficient capacity to enable individual valves to operate in the required sequence without decreasing the efficiency of the pulses due to insufficient air capacity. Thus, most systems employ a relatively large capacity tank to which individual valves are mounted, each valve being located above a filter element to be cleaned. In order to safely contain the pressurised air, such tanks are typically of cylindrical configuration, and thus the individual valves need to be mounted to a curved wall which adds to the difficulty of the mounting arrangement for the individual valves on the tank. Alternatively, a valve may be provided to allow for cleaning of an entire row of filters, whereby the filters are suspended below a blow tube which is typically in the form of a pipe having a series of holes with each hole corresponding to a filter element so as to distribute cleaning air into each of the filters.

SUMMARY OF THE INVENTION

According to a first aspect of the invention there is provided a valve for use in the control of pressurised air from a pressure tank, the pressure tank including a wall in which an outlet port is formed, the wall having an inner surface and an outer surface, the valve comprising:

a valve body of generally cylindrical configuration having an inner end which in use is located inside the pressure tank and an outer end which in use is located outside of the tank;

a flow passage extending through the valve body, the flow passage having an inlet at or adjacent the inner end of the body and an outlet at or adjacent the outer end of the body;

a valve seat surrounding the flow passage;

a valve closure member moveable towards and away from the valve seat to close and open the valve respectively;

operating means for moving the valve closure member in order to operate the valve;

the valve being characterised in that the valve body has at least one laterally extending mounting formation at or adjacent the inner end thereof, the mounting formation being shaped and dimensioned to enable the inner end and the mounting formation to be introduced into the pressured tank through the outlet port, and when in position, the mounting formation engages with the inner surface of the wall of the tank adjacent the outlet port; and the valve including a mounting collar movable towards the mounting formation so as to engage the outer surface of the wall adjacent the opening and thereby clamp the tank wall between the mounting formation and the mounting collar.

The laterally extending mounting formation preferably comprises a pair of laterally extending flanges on the opposite side of the valve body. Preferably the flanges have an underside which is contoured so as to seat against the inner surface of the wall.

The valve seat may be located adjacent the inner end of the valve body, the valve closure member being located inside the pressure tank when the valve is operatively mounted to a tank.

Preferably the mounting collar includes a sealing means for forming a seal around the outlet port. The mounting collar may have a sealing face which seats against the outer surface of the wall. The sealing face may have an annular groove therein in which an annular sealing ring is located. The collar may have a sealing ring on the radially inner face thereof, the sealing ring forming a seal with the radially outer surface of the valve body. The mounting collar is preferably movable by means of a union nut which is in threaded engagement with screw threads formed on the valve body.

According to a second aspect of the invention there is provided a valve for use in the control of pressurised air from a pressure tank, the pressure tank including a wall in which an outlet port is formed, the wall having an inner surface and an outer surface, the valve comprising:

a valve body of generally cylindrical configuration which defines an inner end which in use is located inside the pressure tank, and an outer end which in use is located outside of the tank;

a flow passage extending through the valve body, the flow passage having an inlet at or adjacent the inner end of the body and an outlet at or adjacent the outer end of the body;

a valve seat surrounding the flow passage;

a valve closure member movable towards and away from the valve seat to close and open the valve respectively; and operating means for moving the valve closure member in order to operate the valve;

the valve being characterised in that the valve body has a cylinder coaxially mounted thereto or formed thereon on the inner end of the valve body, the valve closure member being in the form of a piston slidable within the cylinder towards and away from the valve seat, the piston being adapted to engage the valve seat to close the valve.

Preferably the cylinder is connected to the valve body by a plurality of cylinder support arms which hold the cylinder coaxially aligned with the valve seat, gaps between the arms defining the inlet to the flow passage.

The operating means preferably comprises a pilot valve adapted to either vent the cylinder to atmosphere or provide a source of high pressure fluid to cause the piston to move relative to the valve seat. The cylinder is preferably linked to the pilot valve via a pilot valve passage which passes along one of said cylinder support arms.

A further feature of the invention provides a valve closure member adapted to seal with a valve seat of a valve in use comprising, a piston disc and a valve closure disc, the two discs held coaxially together by a spindle, the piston disc having a sealing ring extending around its peripheral edge, the valve closure disc having a guide surface on its peripheral edge which assists in keeping the valve closure disc aligned with the valve seat in use.

These and further features of the invention will be made apparent from the description of an embodiment thereof given below by way of example. In the description reference is made to the accompanying drawings but the specific features shown in the drawings should not be construed as limiting on the invention.

BRIEF DESCRIPTION OF THE DRAWINGS

FIG. 1 shows a perspective view of a valve body for a valve according to the invention.

FIG. 2 shows a side view of the valve body shown in FIG. 1.

FIG. 3 shows a plan view of the valve body shown in FIG. 1.

FIG. 7 shows a similar view to that of FIG. 2, but with the collar and lock nut installed on the valve.

FIG. 8 shows a cross-sectional side view along line VIII-VIII shown in

FIG. 7.

DETAILED DESCRIPTION OF THE EMBODIMENTS

Figure 4:
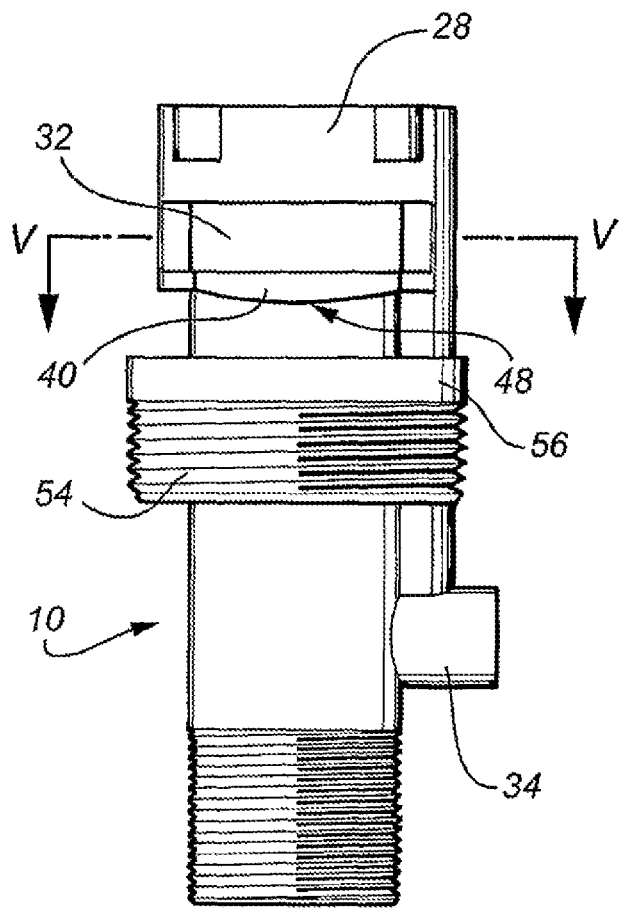
FIG. 4 shows a side view of the valve body shown in FIG. 1, at 90 degrees to the side view shown in FIG. 2.
Figure 5:
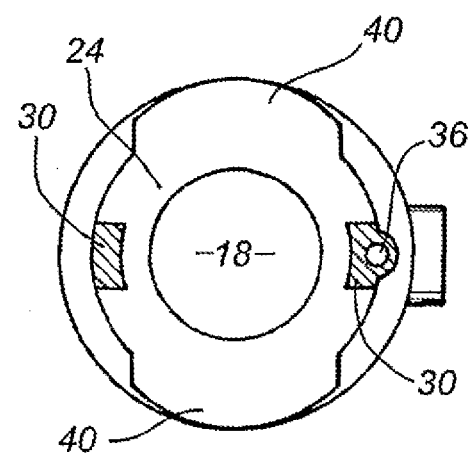
FIG. 5 shows a cross sectional view along line V-V shown in FIG. 4.

Referring initially to FIGS. 1 to 5, a valve body 10 is formed as a unitary casting and is of generally cylindrical configuration having an inner end 12 and an outer end 14. The inner end 12 will generally be mounted within a pressure tank, shown diagrammatically at 16 in FIG. 2, with the inner end 12 inside the tank and the outer end 14 outside of the tank. A flow passage 18 extends through the valve body, the flow passage 18 having an inlet 20 and an outlet 22. A valve seat 24 surrounds the flow passage 18 and will be opened and closed by a piston type valve closure member, as described in more detail below.

A cylinder 26 is located on the inner end of the valve body and contains in slidable manner a piston type valve closure member 28, described in detail below. The cylinder 26 is provided with a removable end wall 29 shown most clearly in FIGS. 7 and 8 of the drawings. The cylinder 26 is connected to the rest of the valve body by means of a pair of cylinder support arms 30. Gaps 32 between the support arms provide an entry into the flow passage 18 through which high pressure air enters the flow passage 18 when the valve is open.

The valve is opened and closed by means of a pilot valve 35 which is connected, either directly or indirectly, to a pilot valve port 34. As is shown clearly in FIG. 8 of the drawings, the pilot valve port 34 connects to a pilot valve flow passage 36 which in turn connects to the interior of cylinder 26 in order to operate the valve closure member. These aspects will be discussed in more detail below.

For mounting purposes, the valve body is provided with a pair of outwardly directed flanges 40 located near the inner end of the valve body. These flanges 40 are shaped and dimensional so that they will fit within an outlet port 42 in the wall of a tank 16. As is shown diagrammatically in FIG. 2, the tank 16 has an inner surface 44 and an outer surface 46 and when the valve is properly mounted in the outlet port 42, the flanges 40 will bear against the inner surface 44 to hold the valve body firmly to the tank.

Typically, the tank 16 will be of cylindrical configuration and thus the wall in which the valve body is mounted will be curved. Thus, the under surfaces 48 of the flanges 40 will be curved to match the curvature of the tank.

Figure 6:
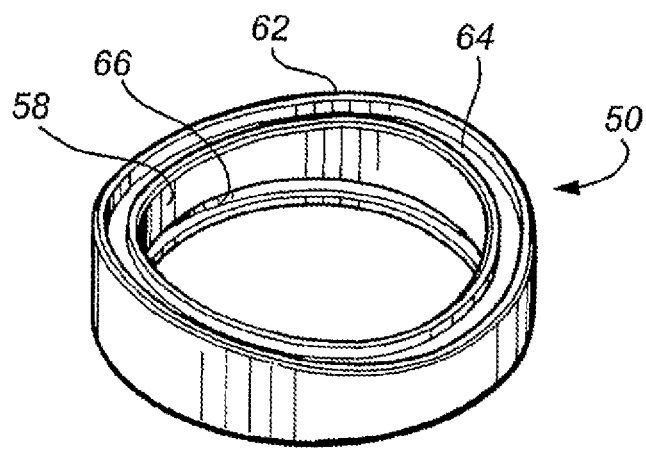
FIG. 6 shows a perspective view of a collar for use in mounting the valve body to a tank.

The diameter of the outlet port 42 will be selected so that by manipulating the valve body to first introduce one flange 40 inside the tank, and then the other flange to the tank both flanges 40 will be located inside the tank and will rest on the inner surface 44 of the tank. To achieve this arrangement the maximum distance between the opposite peripheral edges of the flanges 40 will be greater than the diameter of the outlet port 42. That is, each of the flanges 40 will rest on opposite sides of the outlet port 42 and removal of the valve when the valve is perpendicular to the wall will not be possible. At this point, the valve body will be clamped into position using a mounting collar 50, as shown in FIG. 6 of the drawings.

As shown in FIG. 1 of the drawings, the valve body 10 includes a central region 52 which has a lower threaded portion 54 and has an upper smooth section 56. The inner surface 58 of the collar 50 is a sliding fit on that smooth surface 56 and a union nut 60 shown in FIGS. 7 and 8 of the drawings is used to urge the mounting collar 50 against the outer surface 46 of the tank 16.

Thus, when the valve body is first introduced into the tank the mounting collar 50 will be in a retracted position, that is, the union nut 60 will have been screwed towards the outlet end 14 of the valve body. Once the flanges 40 have been located inside the tank, the union nut 60 will be screwed in the opposite direction, thereby urging the mounting collar 50 to engage the outer surface 46 of the tank.

To ensure that a seal is formed around the outlet port 42, the mounting collar has a pair of seals. The face of the mounting collar 60, which contacts the tank, that is, the sealing face 62 shown in FIG. 6 of the drawings, is of saddle shape so as to conform to the cylindrical shape of the tank. An annular groove 64 is formed in the sealing face 62 which will receive an o-ring or the like (not shown) which will form a fluid tight seal with the outer surface 46 of the tank.

Likewise, the radially inner face 58 of the mounting collar has an annular groove 66 therein which will also receive an o-ring or like seal to enable that inner face 58 to seal with the smooth surface 56 of the valve body. It will be appreciated that these two seals will seal the outlet port 42 when the mounting collar 50 is firmly engaged against the outer surface 46 of the tank.

The union nut 60 will generally be screwed into position using a suitable tool such as a wrench or the like. A washer 68 is provided between the mounting collar 50 and the union nut 60 so that the urging of the mounting collar 50 is achieved as smoothly as possible. The washer 68 may be formed from a polymeric material having a relatively low friction coefficient so as to ensure smooth tightening of the union nut 60. Alternatively, the washer 68 may be formed from an elastomeric material.

It will be appreciated that in order to mount a valve of the type described herein to a pressure tank, all that will be required is the correct diameter outlet port will need to be drilled into the wall of the tank and thereafter the valve body can be fitted into position without requiring any further drilling, mounting screws, locking clips, or other mounting arrangements. All that will be required, once the flanges 40 have been correctly inserted through the outlet port will be for the union nut to be tightened to thereby urge the mounting collar into its clamped and sealed configuration.

It will of course be possible to use an urging means which is different from the union nut 60 described herein. For example, a plurality of individual screw means could be employed. However, it is considered to be advantageous that a valve body can be mounted in position by only drilling a single outlet port in the pressure tank.

It will be appreciated that the valve closure member 28 and the cylinder 26 are located inside of the tank, that is, upstream of the flow passage 18. The valve closure mechanism is a relatively short travel piston. The piston 38 is formed of two discs, that is, a piston disc 70 and a valve closure disc 72. The two discs are held coaxially aligned by spindle or neck 74 which in the present embodiment is of reduced diameter. The piston disc 70 has a peripheral edge 76 which includes a groove 78 in which an o-ring seal or the like is located. The piston disc 70 slides within the cylinder 26 towards and away from the valve seat 24. As will be clear from FIG. 8, when the sealing disc 72 engages the valve seat 24 the flow passage 18 will be closed, and flow through the valve will not be possible.

Figures 7, 8:
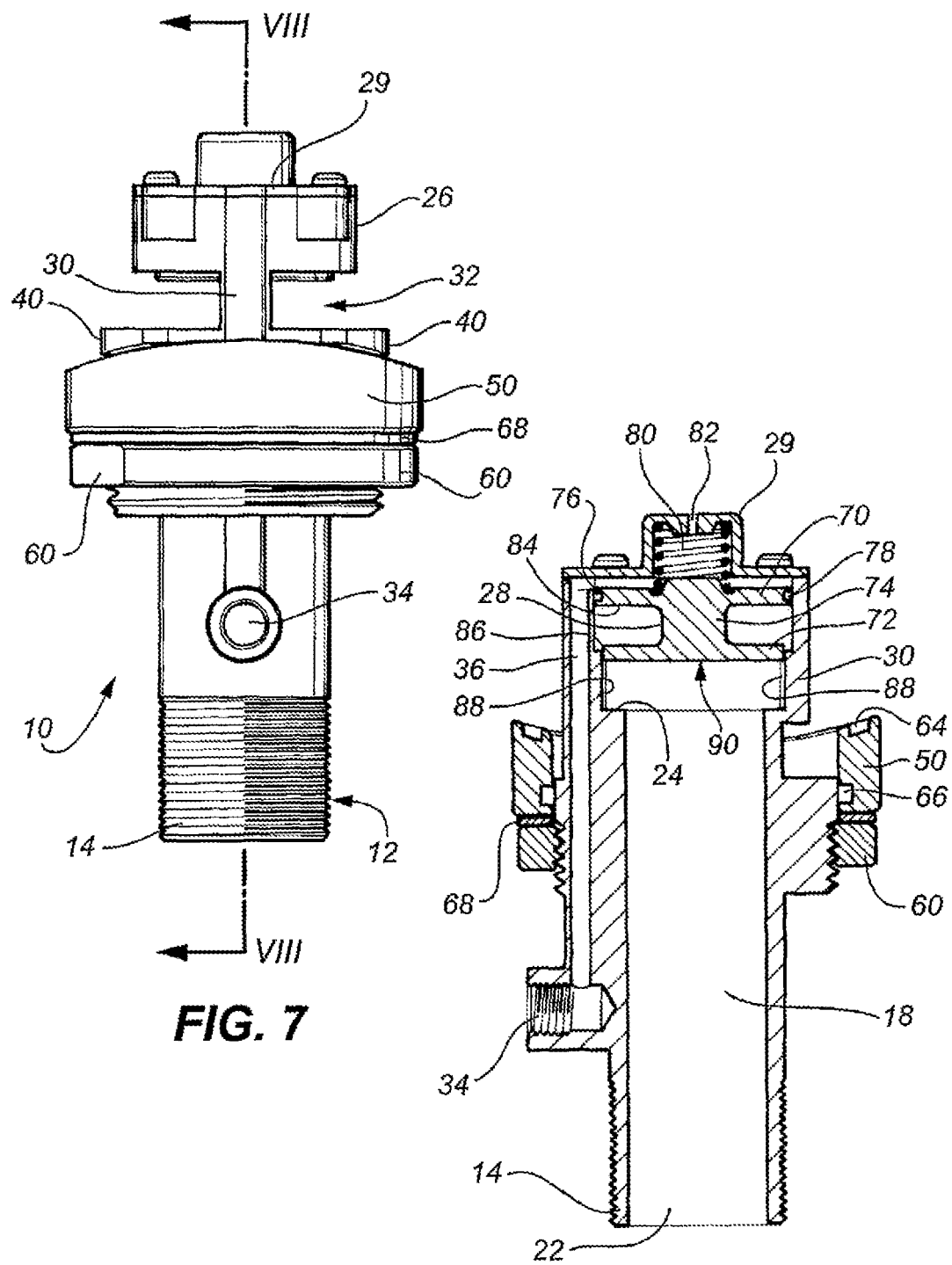

In the embodiment shown in FIG. 8, the valve closure member 28 is spring assisted by means of a compression spring 80 which acts between the end cap 29 and the valve closure member 28. In other or alternate embodiments, spring assistance need not be provided to the valve closure member 28. In addition, the end cap 29 includes a bleed passage 82 which will allow pressurised air from within the pressure tank to act on the back face of the valve closure member 28 to urge the valve closure member 28 towards the valve seat 24, that is, towards a closed position. To open the valve, the pilot valve 35 (FIG. 3) will open to atmosphere, allowing the pressurised air behind the valve closure member 28, within the cylinder, to evacuate through the port 34, thus causing pressurised air to act on the underside 84 of the piston disc 70, thereby urging the valve closure member 28 into its open position. Since the undersurface 84 is of relatively large area, rapid opening of the valve will take place as soon as the pressurised air behind the valve closure member is exhausted. To close the valve, the pilot valve 35 will be used to close port 34, thereby allowing pressurised air to enter into the cylinder through bleed passage 82, thereby driving the valve closure member 28 back against the valve seat 24 to thereby rapidly close the valve.

Of course, it will be possible to operate the valve using high pressure air passing into the cylinder 26 through the pilot passage 36. The valve would need to be of a different configuration to that described above, but essentially the valve would operate in reverse, that is, using high pressure air will be used to keep the valve closed and dissipating that high pressure air will operate to open the valve.

It will be noted that the valve closure disc 72 has a periphery 86 which is in sliding contact with guide surfaces 88 formed on the inside of the cylinder support arms 30. These guide surfaces 88, together with the inner wall of the cylinder 26, serve to hold the valve closure member 28 aligned with the valve seat 24, that is, the undersurface 90 of the sealing disc 72 will be parallel to the valve seat 24 as the valve closure member 28 moves towards and away from the valve seat 24.

It is envisaged that the valve closure member 28 could be formed from a relatively light weight plastics material, such as a high quality nylon material or the like. Suitable plastics materials which will stand the rigours of the opening and closing movements, and yet will not distort in use, could be moulded and hence be relatively inexpensive.

Figure 9:
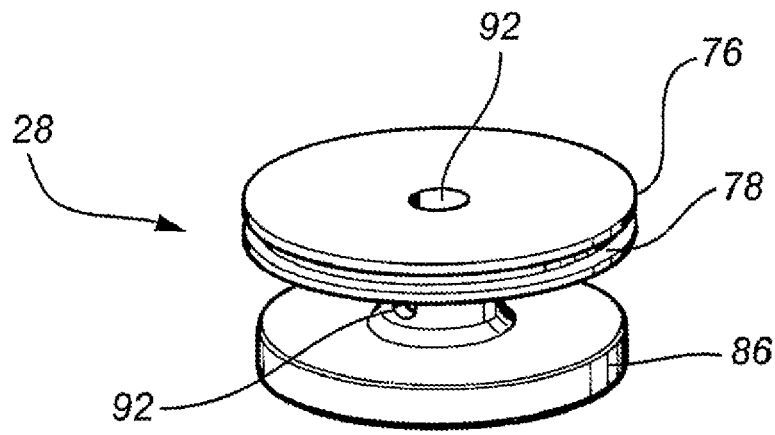
FIGS. 9 to 11 show perspective views of different valve closure members for use in the valve body shown in FIG. 1.
Figure 10:
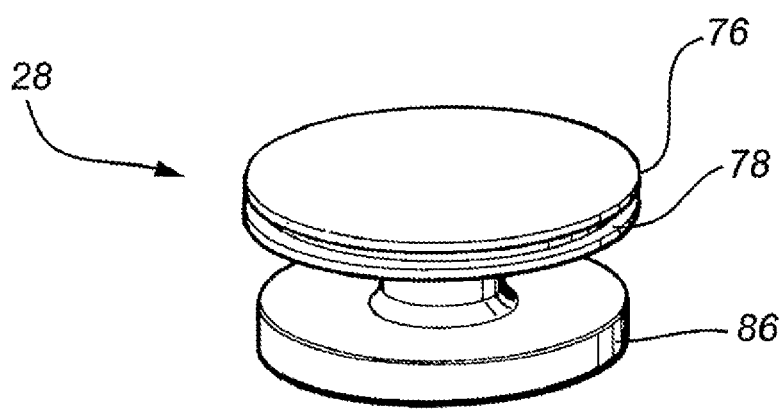
Figure 11:
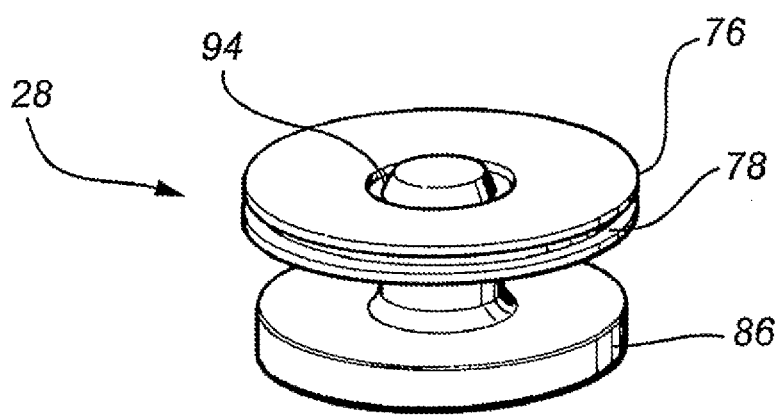

Various different embodiments of piston type valve closure members are shown in FIGS. 9 to 11 of the drawings, FIG. 9 has a valve closure member which includes a bleed passage 92. FIG. 10 shows a valve closure member with no bleed passage and which will be used without a compression spring and FIG. 11 shows a valve closure member with an annular groove 94 in the upper surface thereof which will locate a compression spring of the type depicted in FIG. 8 of the drawings. Clearly, each of the valve closure members shown in FIGS. 9 to 11 could be moulded from a suitable plastics material, in the manner described above, and each will include a groove 78, and a guide surface 86 for the purposes referred to above.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

What is claimed is:

1. A valve closure member adapted to seal with a valve seat of a valve in use, wherein the valve is used in the control of pressurised air from a pressure tank, the pressure tank including a wall in which an outlet port is formed, the wall having an inner surface and an outer surface, comprising, a piston disc and a valve closure disc, the discs held coaxially together by a spindle, the spindle having a diameter that is less than a diameter of the piston disc and the valve closure disc, the piston disc having a recess extending around its peripheral edge, the piston disc further having a bleed passage running from a top surface of the piston disc to a lateral surface of the spindle; and the valve closure disc having a peripheral surface for maintaining the valve closure disc aligned with a valve seat in use wherein the valve includes:

a valve body of generally cylindrical configuration which defines an inner end which in use is located inside the pressure tank, and an outer end which in use is located outside of the tank;

a flow passage extending through the valve body, the flow passage having an inlet at or adjacent the inner end of the body and an outlet at or adjacent the outer end of the body;

a cylinder coaxially mounted to the valve body or formed thereon on the inner end of the valve body wherein the valve seat surrounds the flow passage;

wherein the valve closure member is movable towards and away from the valve seat to close and open the valve respectively; and operating means for moving the valve closure member in order to operate the valve.

2. The valve closure member of claim 1, the piston disc, the valve closure disc and the spindle comprising a single piece.

3. The valve closure member of claim 1, the piston disc having an outside diameter that is greater than an outside diameter of the valve closure disc.

4. The valve closure member of claim 1, further comprising a seal for engaging the recess of the piston disc.

5. The valve closure member of claim 4, the seal comprising an o-ring.

6. The valve closure member of claim 1, the closure member comprising plastic.

7. The valve closure member of claim 5, the closure member comprising nylon.

8. The valve closure member of claim 1, the peripheral surface of the valve closure disc comprising a guide surface.

9. The valve closure member of claim 1, the piston disc further having an annular groove formed in a top surface thereof.

10. The valve closure member of claim 9, comprising a compression spring for engaging the annular groove.

11. A valve closure member adapted to seal with a valve seat of a valve in use, wherein the valve is used in the control of pressurised air from a pressure tank, the pressure tank including a wall in which an outlet port is formed, the wall having an inner surface and an outer surface, comprising, a piston disc and a valve closure disc held coaxially together by a spindle, the spindle having a diameter that is less than an outside diameter of the piston disc and the valve closure disc, the piston disc having a recess extending around its peripheral edge, the piston disc further having an annular groove formed in a top surface thereof, the valve closure disc having a peripheral surface for maintaining the valve closure disc aligned with a valve seat in use wherein the valve includes:

a valve body of generally cylindrical configuration which defines an inner end which in use is located inside the pressure tank, and an outer end which in use is located outside of the tank;

a flow passage extending through the valve body, the flow passage having an inlet at or adjacent the inner end of the body and an outlet at or adjacent the outer end of the body;

a cylinder coaxially mounted to the valve body or formed thereon on the inner end of the valve body wherein the valve seat surrounds the flow passage;

wherein the valve closure member is movable towards and away from the valve seat to close and open the valve respectively: and operating means for moving the valve closure member in order to operate the valve.

12. The valve closure member of claim 11, the piston disc, the valve closure disc and the spindle comprising a single piece.

13. The valve closure member of claim 11, the piston disc having an outside diameter that is greater than an outside diameter of the valve closure disc.

14. The valve closure member of claim 11, comprising a seal for engaging the recess.

15. The valve closure member of claim 14, the seal con rising an o-ring.

16. The valve closure member of claim 11, the closure member comprising plastic.

17. The valve closure member of claim 16, the closure member comprising nylon.

18. The valve closure member of claim 11, the peripheral surface of the valve closure disc comprising a guide surface.

19. The valve closure member of claim 11, comprising a compression spring for engaging the annular groove.

20. The valve closure member of claim 11, the piston disc further having a bleed passage running from a top surface of the piston disc to a lateral surface of the spindle.

* * * * *